May 20, 1969 H. W. A. GERLACH 3,445,778

WALL CURRENT AMPLIFIER AND OSCILLATOR

Filed June 25, 1965 Sheet 1 of 5

INVENTOR.
HORST W. A. GERLACH

BY Harry M. Saragovitz,
Edward J. Kelly, Herbert Berl
Charles L. Whitham ATTORNEYS

INVENTOR,
HORST W. A. GERLACH

BY Harry M. Saragovitz,
Edward J. Kelly, Herbert Berl
& Charles L. Whitham ATTORNEYS May 20, 1969 H. W. A. GERLACH 3,445,778

WALL CURRENT AMPLIFIER AND OSCILLATOR

Filed June 25, 1965 Sheet 3 of 5

INVENTOR.
HORST W. A. GERLACH

BY Harry M. Saragovitz, Edward J. Kelly, Herbert Berl & Charles L. Whitham ATTORNEYS

INVENTOR,
HORST W. A. GERLACH

BY Harry M. Saragovitz,
Edward J. Kelly, Herbert Berl
& Charles L. Whitham ATTORNEYS

INVENTOR.
HORST W. A. GERLACH

BY Harry M. Saragovitz, Edward J. Kelly, Herbert Berl & Charles L. Whitham ATTORNEYS United States Patent Office 3,445,778
Patented May 20, 1969

3,445,778

WALL CURRENT AMPLIFIER AND OSCILLATOR

Horst W. A. Gerlach, Bethesda, Md., assignor to the United States of America as represented by the Secretary of the Army Filed June 25, 1965, Ser. No. 467,147
Int. Cl. H03f 3/58, 3/10, 3/12
U.S. Cl. 330—43 12 Claims

ABSTRACT OF THE DISCLOSURE

This disclosure describes a traveling wave amplifier that utilizes an array of tunnel diodes in the sidewalls of a cylindrical waveguide. The diodes are oriented either perpendicular or parallel to the axis of the waveguide and are located so that each conducts a fractional part of the wall current. When biased into their negative resistance regions, the diodes pump microwave energy into the waveguide thereby providing fast wave amplification. By placing a shorting plate or sliding short in one open end of the waveguide a quarter wave resonator is produced converting the device into a wall current oscillator.

The invention described herein may be manufactured and used by or for the Government of the United States of America for governmental purposes without the payment to me of any royality thereon.

This invention relates to traveling-wave devices and more particularly to highly efficient microwave amplifiers and oscillators using negative resistance solid state elements.

Low noise amplification at microwave frequencies has for many years been achieved by means of vacuum tube amplifiers. Among the most efficient vacuum tube amplifiers at very high frequencies is the traveling-wave tube. This device employs a high voltage electron beam as a source of energy. The electron beam is made to pass in close proximity to a slow wave structure. When the phase velocity of an electromagnetic wave traveling in the slow wave structure is approximately equal to the electron velocity, energy is coupled from the electro beam to the electromagnetic wave. In order to obtain good efficiency and performance with the traveling-wave tube, it is necessary that the electron beam pass as close as possible along the length of the slow wave structure since the beam interaction with the electromagentic wave takes place very close to the slow wave structure. Consequently, there is a great possibility that the beam current will be intercepted by the structure. To avoid this, the electron beam requires elaborate focusing and components must be carefully aligned. Of course, the entire device must be enclosed in an evacuated envelope and, if exposed to severe environmental conditions, costly structural modifications must be made to improve the ruggedness of the device.

Recently microwave amplifiers using various types of solid state devices as active elements have been developed which in many respects are superior to vacuum tube amplifiers. Solid state microwave amplifier structures have taken many forms including parametric amplifier circuits which employed the junction capacitance of a diode as a variable reactance in the "pump" and negative resistance devices mounted in transmission lines, cavities and wave guides in varying configuration. All of these amplifier structures enjoy certain advantages such as a low noise figure, ability to operate at high microwave frequencies, and very low power requirements. However, these structures have the disadvantage of low maximum power output.

Microwave amplifiers which employ negative resistance devices amplify by "negatively attenuating" the signal.

Perhaps the best known negative resistance device is the Esaki or tunnel diode. This device has a characteristic S shaped voltage-current curve for positive voltage and current. A portion of this curve has a negative slope. Thus, if the tunnel diode is biased to operate in the region of the negative slope of the voltage current curve, then it appears as a negative resistance. In addition to the tunnel diode, many other two-terminal devices which are characterized as negative resistance diodes are known to exhibit similar regions of negative dynamic resistance in their characteristic voltage-current curves. Such devices include the PNPN-type diode and certain germanium diodes. While devices such as these can in general be used in practicing the present invention, for purposes of illustration only the tunnel diode will be referred to in the following descriptions.

According to the state of the art, the power generated with tunnel diodes at microwave frequencies varies from the order of a few milliwatts at C band to a few microwatts at X band. The power level and frequency limitations of tunnel diode circuits are usually determined by the geometry and current capability of the tunnel diode and the impedance match of the tunnel diode to the circuit. This latter factor is most important since if the tunnel diode is improperly matched to the circuit, then this match leads to very inefficient operation of the device. It is generally known that the impedance match constitutes a difficult problem and is very often nearly impossible to solve satisfactorily. If reasonable matching is achieved, usually it is at the expense of band width or optimum gain, or both, in an amplifying device or available power output in an oscillator. In addition, attempts to provide a proper impedance match may cause parasitic oscillations which modulate and reduce the output power.

One method of increasing the power output of a microwave amplifier is to place a number of negative resistance diodes in parallel as is done in the applicant's invention in traveling-wave amplifier and oscillator with tunnel diodes, U.S. Patent No. 3,171,086. The invention in this patent employs a slow wave ladder-line structure having tunnel diodes mounted in the rungs of the structure. An increasing number of diodes are mounted in parallel in succeeding rungs in the direction of the wave propagation. Since the tunnel diodes are very low impedance devices and since diodes that are connected in parallel produce a combination with a still lower impedance, it is apparent that the problem of matching the impedance of the diodes to the microwave structure becomes increasingly difficult as more diodes are connected in parallel.

Another method of increasing the power output of microwave amplifiers is to connect a number of negative resistance diodes in series. While the problem of impedance matching in a series configuration is not as acute as in a parallel configuration, the problems associated with mounting, tuning and providing individual bias for each diode often detract considerably from this method.

It is therefore an object of this invention to provide a high efficiency microwave amplifier using negative resistance diodes.

It is another object of the present invention to provide a solid state microwave oscillator capable of producing high output power.

It is a further object of the instant invention to provide a microwave amplifier using tunnel diodes in a microwave structure in which the problems of impedance matching between the tunnel diodes and the microwave structure are effectively overcome without compromise in band width or gain.

It is yet another object of this invention to provide a high efficiency microwave oscillator using tunnel diodes which can be tuned over a considerable frequency range.

It is still another object of the invention to provide solid state traveling-wave amplifiers and oscillators which are extremely rugged, compact and easy to build.

In the applicant's copending application entitled Wall Current Amplifier and Oscillator, Ser. No. 442,217, filed Mar. 23, 1965, and assigned to the assignee of the present application, similar objects are attained by providing in the narrow side walls of a rectangular waveguide an array of negative resistance diodes. The diodes are located in the wall current paths when the wave guide is excited in the $TE_{01}$ mode. When the diodes are biased into their negative resistance region, each diode pumps radio-frequency energy into the wave guide and a fast wave amplification takes place, in the case of an amplifier; or a standing wave of radio-frequency energy is established in the wave guide, in the case of an oscillator.

The applicant has discovered that the conditions for amplification and oscillation in the invention in application Ser. No. 442,217 can also be attained for other wave guide configurations which may oscillate in the TE, TM and TEM modes, where the latter mode may be referred to as the mode of propagation in coaxial lines or other transmission lines. The present invention is particularly concerned with solid state microwave amplifiers and oscillators employing wave guides having round configurations. Depending on the type of oscillation mode, the negative resistance devices are arranged in parallel or series arrays. The negative resistance devices are always properly situated in the RF circuit at a low impedance point, or at a position where the current is maxmium.

The specific nature of the invention, as well as other objects, aspects, uses and advantages thereof, will clearly appear from the following description and from the accompanying drawing, in which.

Figure 1:
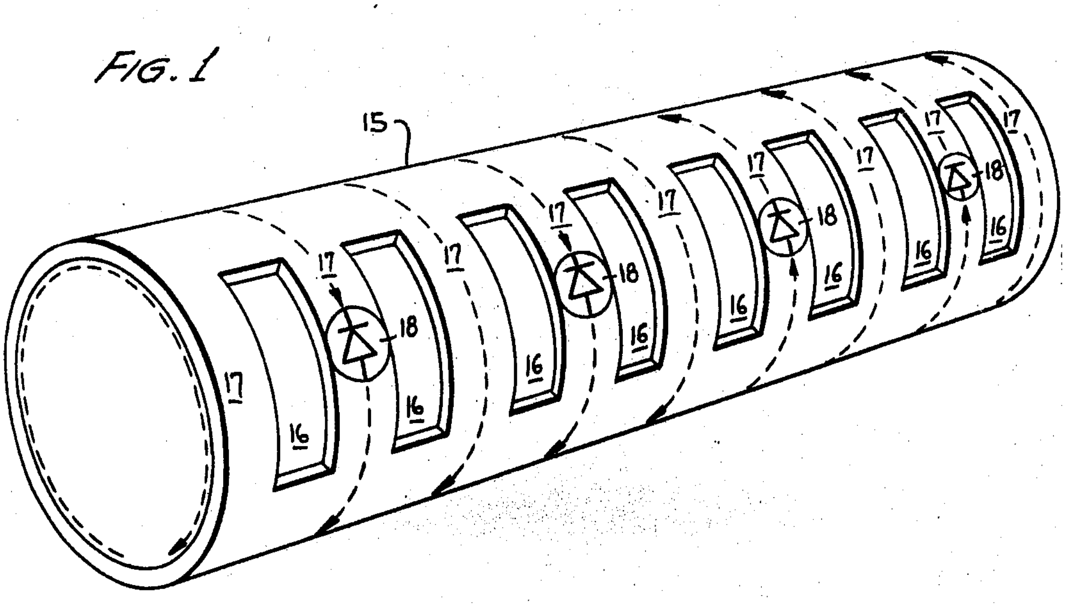
FIGURE 1 is a perspective view of an amplifier according to the present invention using a round wave guide oscillating in the $TE_{01}$ mode.

Referring now to the drawings and more particularly to FIGURE 1, a solid state microwave amplifier according to the present invention is shown as comprising a round wave guide 15. When radio-frequency energy is propagated in the wave guide 15, radio-frequency current flows in the walls of the wave guide. The wall current distribution in the wave guide section 15 is illustrated by the dashed arrows in FIGURE 1 for one cycle of electromagnetic oscillation of the radio-frequency energy in the $TE_{01}$ mode. As shown, the wall current flows circumferentially around the walls of the round wave guide changing direction as the radio-frequency energy passes through a null. The wall of wave guide section 15 has a plurality of resonant windows 16 and rungs 17 oriented perpendicular to the axis of the wave guide section and uniformly spaced along the axis of the wave guide section. Tunnel diode assemblies 18 are fabricated into every other rung. The specific details of this structure of the tunnel diode assemblies 18 are set forth hereinafter. The resonant windows 16 provide radio-frequency coupling of the tunnel diode assemblies 18 to the wave guide section 15, while the rungs 17 provide paths for the wall currents in the wave guide. As shown in FIGURE 1, all of the tunnel diode assemblies 18 are polarized in the same direction. This means that for any one cycle of radio-frequency energy propagated through the wave guide section 15, only half of the tunnel diode assemblies are contributing to the amplification effect of the amplifier. During the next succeeding cycle of radio-frequency energy, the other half of the tunnel diode assemblies will contribute to the amplification effect. As described in the aforementioned application Ser. No. 442,217, a "full wave" amplification effect may be produced by fabricating into the wave guide wall another array of tunnel diode assemblies coupled to the wave guide 15 by resonant windows and positioned diametrically opposite the array of tunnel diode assemblies shown in FIGURE 1. This second array of tunnel diode assemblies would be polarized in the same direction as the polarization of the first array of tunnel diode assemblies. As explained in the aforementioned copending application, Ser. No. 442,217, while only half of the tunnel diode assemblies in either array produces an amplification effect during any one given cycle of radio-frequency energy, an amplification effect is produced over the entire length of the microwave amplifier using the "full wave" structure.

Figure 2:
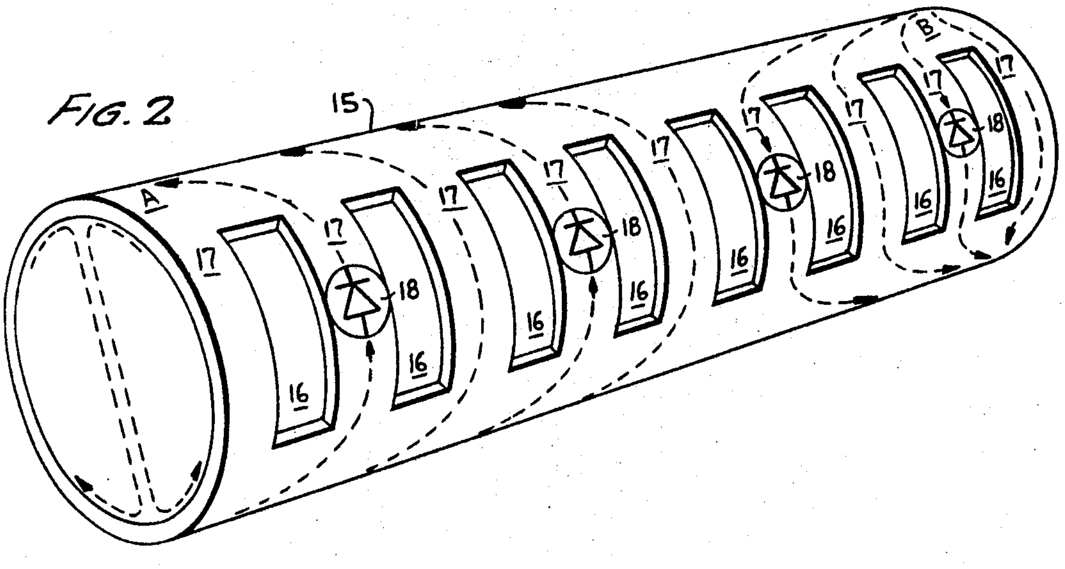
FIGURE 2 is a perspective view of a microwave amplifier according to the present invention using a round wave guide oscillating in the $TE_{11}$ mode.

FIGURE 2 illustrates the solid state microwave amplifier shown in FIGURE 1 propagating radio-frequency energy which is oscillating in the $TE_{11}$ mode. As may be seen in the figure, this mode of propagation of the radio-frequency energy results in a wall current distribution differing from that shown in FIGURE 1. Instead of current flowing circumferentially around the round wave guide 15, current flows across the bottom of the wave guide 15, up the sides, through rungs 17 and across the top of the wave guide toward a current sink A. At the same time, current flows from a current source B across the top of the wave guide and down the side, through rungs 17 and down across the bottom of the wave guide. A current sink A is separated from a current source B by a distance equal to $\lambda g/2$ where $\lambda g$ is the wave length of the radio-frequency energy propagating in the wave guide 15. The arrows which appear to emanate from the current sink A at the top of the wave guide 15 and flow toward the bottom of the wave guide represent the displacement current flowing between the current sink at the top to an image current source at the bottom. "Full wave" amplification may also be produced in the amplifier shown in FIGURE 2 by adding a second tunnel diode assembly array to the wave guide wall diametrically opposite the tunnel assembly array shown in the figure. However, this second array must be polarized oppositely to the polarization of the tunnel diode assembly in the first array. The reason for this is that for radio-frequency energy oscillation in the $TE_{11}$ mode, the wall currents through diametrically opposed rungs in the wave guide wall are in the same direction.

Figure 3:
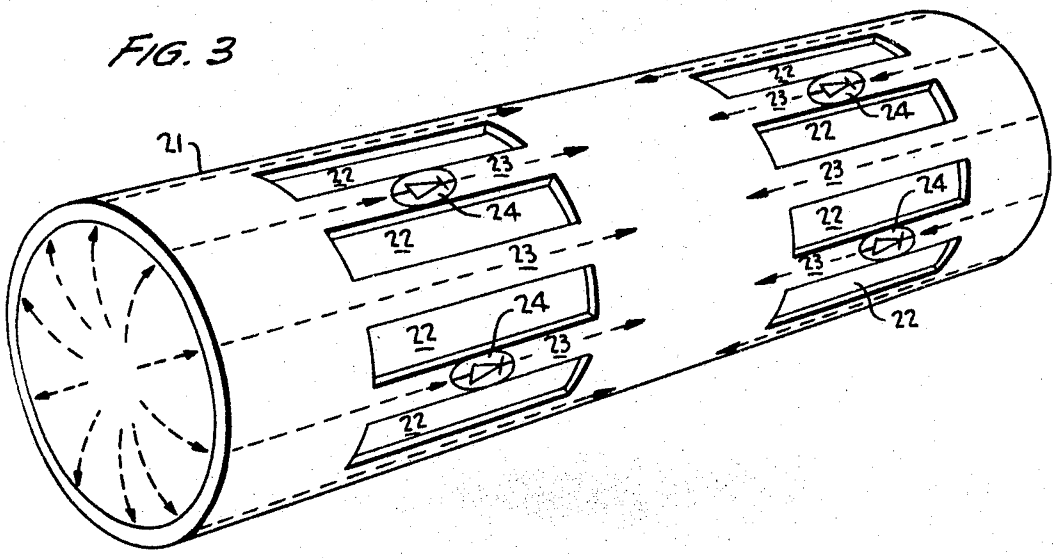
FIGURE 3 is a perspective view of a microwave amplifier according to the present invention using a round wave guide oscillating in the $TM_{01}$ mode.

FIGURE 3 illustrates the solid state microwave amplifier according to the present invention which comprises a round wave guide 21. In this case radio-frequency energy is propagated along the axis of the wave guide in the $TM_{01}$ mode. The dashed arrows illustrate the current distribution for radio-frequency energy oscillation in this mode of propagation. As may be seen, the wall currents flow parallel with the axis of propagation. Therefore, the resonant windows 22 and rungs 24 are arranged parallel to the axis of the wave guide. The resonant windows 22 and the rungs 23 are arranged uniformly around the circumference of the wave guide 21. This resonant window and rung structure is repeated periodically along the length of the wave guide 21. As before, tunnel diode assemblies 24 are fabricated into every other rung. In order to achieve full wave amplification in this microwave amplifier, it is necessary that half the tunnel diode assemblies in a resonant window rung structure be polarized in the opposite direction to the other half. This is so because for propagation in the $TM_{01}$ mode all of the current flowing through the rungs of any particular one of a rung and resonant window structure is in the same direction about the entire circumference of the wave guide.

Figure 4:
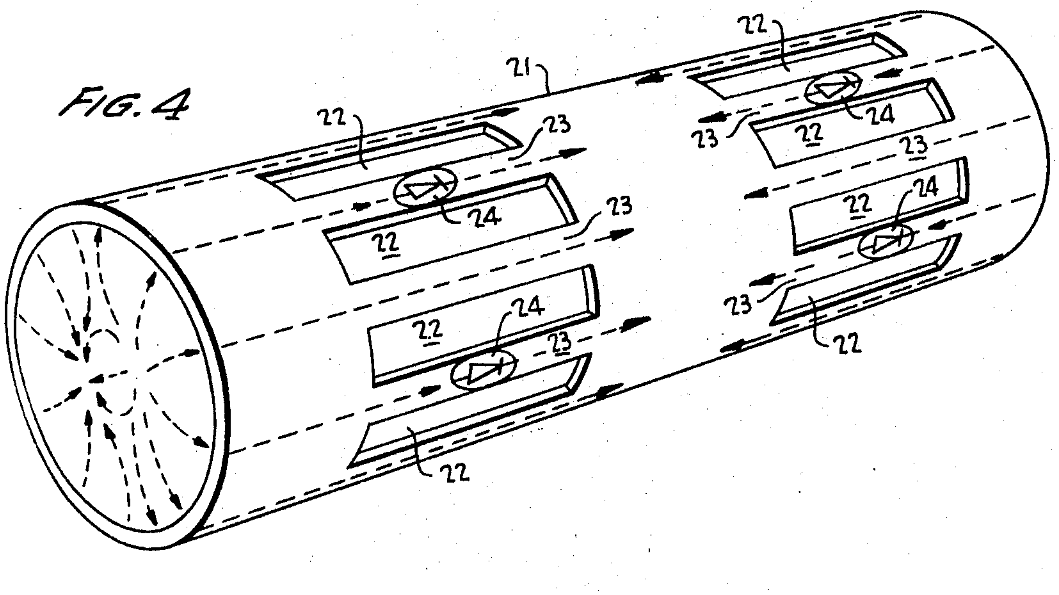
FIGURE 4 is a perspective view of a microwave amplifier according to the present invention using a round wave guide oscillating in the $TM_{11}$ mode.

FIGURE 4 illustrates the same amplifier shown in FIGURE 3 propagating radio-frequency energy in the $TM_{11}$ mode. As may be seen, the difference again is in the current flow. While the wall current flow in this mode of propagation is everywhere parallel with the axis of propagation of the radio-frequency energy, current flow in diametrically opposite rungs is in the opposite direction. As a result "full wave" amplification is achieved by having all the tunnel diode assemblies 24 polarized in the same direction.

Figure 5:
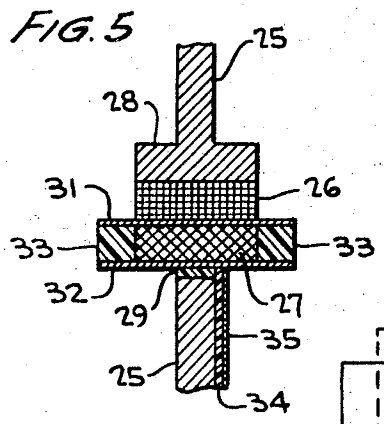
FIGURE 5 is a cross-sectional view illustrating the terminal diode mounting in the wave guide walls of the microwave amplifiers shown in FIGURES 1, 2, 3 and 4.

In each of FIGURES 1, 2, 3 and 4 a run having a tunnel diode assembly fabricated therein is formed with a break that communicates with the resonant windows immediately adjacent. The tunnel diode assembly provides a mechanical and electrical bridge for this break so that all the current flowing in the rung flows through the diode assembly. As shown in FIGURE 5, the tunnel diode assemblies each comprise a tunnel diode 26 in series mechanical and electrical connection with a bias resistor 27. Tunnel diode 26 abuts and makes electrical contact with flange 28 which is integrally formed in a rung 25. On the other side of the break in rung 25 bias resistor 27 is separated from the rung 25 by a small block of insulative material 29 having a suitable dielectric constant. The surface of resistor 27 contacting the block of insulative material 29 and the surface of the rung 25 contacting the block of insulating material 29 thus form a capacitor in series with tunnel diode 26 and bias resistor 27. As is explained in more detail later in the specification, this capacitor performs the function of a direct current by-pass capacitor. It is often desirable to provide a radio-frequency by-pass capacitor across the bias resistor 27 to eliminate parasitic oscillation. To accomplish this two thin metallic plates 31 and 32 are placed on opposite sides of the resistor 27; one between the tunnel diode 26 and the resistor 27 and one between the insulating block 29 and the resistor 27. The plates 31 and 32 overlap the resistor 27 and the space between them not occupied by resistor 27 is filled with an insulating material 33 having a suitable dielectric constant. Thus, the plates 31 and 32 form the plates of a capacitor in parallel with resistor 27. The direct current bias connection to the tunnel diode 26 is made with a strip line comprising an insulative material 34 and a conducting material 35. The strip line runs from the resistor 27 to a convenient point on the wall of the round wave guide to facilitate connection. The strip line is conventional in construction, the insulating material 34 being bonded to the exterior surface of the rung 25. The thin strip of conducting material 35 may be, for example, copper and is narrower than the strip of insulating material to avoid electrical connection with the rung 25. A source of DC bias voltage is connected between the wave guide and the conducting strip 35.

Figure 6:
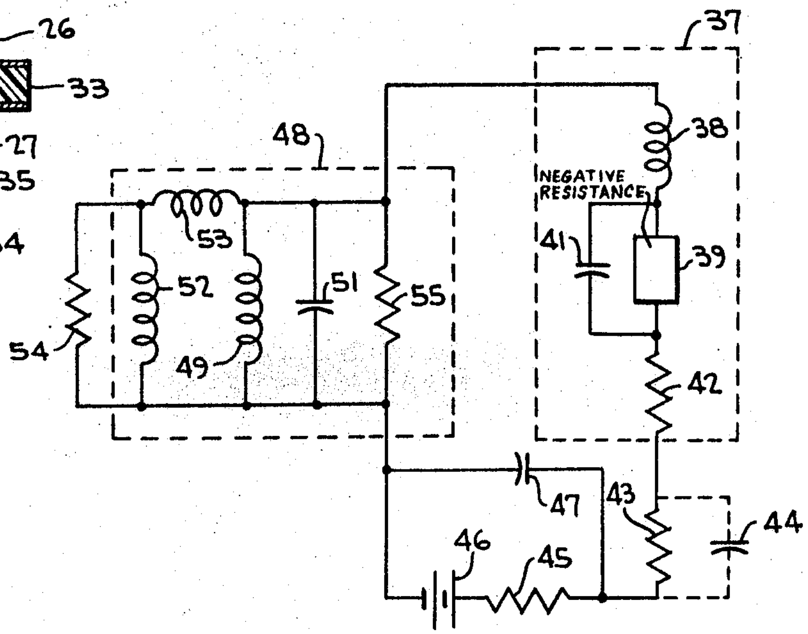
FIGURE 6 is a schematic diagram of a lumped constant equivalent circuit of a single tunnel diode in the wave guide wall of an amplifier as shown in FIGURES 1, 2, 3 and 4.

The equivalent circuit of a section of a wave guide with one tunnel diode taken from any of the amplifiers shown in FIGURES 1, 2, 3 or 4, is illustrated in FIGURE 6. The circuitry enclosed in the dashed box 37 is the lumped parameter equivalent circuit of the tunnel diode. This circuit includes an inductance 38 which is the inductance associated with the connections of the tunnel diode into the wave guide structure. Connected in series with inductance 38 is a negative resistance 39. Shunting resistance 39 is a capacitance 41 which is the capacitance of the tunnel diode junction. A resistance 42 is connected in series with the parallel connection of resistance 39 and capacitance 41. Resistance 42 is the resistance associated with the resistance of the semi-conductive material forming the tunnel diode and the resistance of the connection of the tunnel diode into the wave guide structure. Actually, negative resistance 39 appears in the circuit only when the diode is biased into its negative conducting region. A bias resistor 43 is connected in series with tunnel diode 37. Capacitor 44 is the radio-frequency by-pass capacitor which may be connected in shunt with the bias resistor 43. Connected in series with the bias resistor 43 is a source of bias voltage here represented as a source impedance 45 in a battery 46. A direct current by-pass capacitor 47 is connected in shunt with the source of bias voltage. To complete the circuit, the wave guide structure represented by the circuitry enclosed in the dashed box 48 is connected between the source of bias voltage and the tunnel diode 37. The wave guide structure 48 includes a parallel resonant circuit comprising an inductance 49 and a capacitor 51. This resonant circuit represents a resonant window in the wave guide wall. The energy in the resonant circuit is coupled to the inductance 52 of the wave guide by a mutual inductance 53. The load impedance 54 of the structure is connected in parallel with inductance 52. Impedance 55 which is connected in parallel with the resonant circuit comprising inductance 49 and capacitor 51 represents the reflected load impedance.

The operation of the section of wave guide having a single tunnel diode can be visualized from an inspection of the circuit just described. The tunnel diode 37 is biased into its negative conducting region by the source of bias voltage comprising battery 46 and the bias resistor 43 connected in series with the tunnel diode. Radio-frequency current in the wall of the wave guide flows from the wave guide structure 48 through tunnel diode 37, radio-frequency by-pass capacitor 44, direct current by-pass capacitor 47 and back into the wave guide structure. The amplified current pumped into the wave guide structure 48 by tunnel diode 37 is transformed into energy in the parallel resonant circuit. This energy is coupled by mutual inductance 53 to the wave guide 52 and thence to the output load impedance 54.

For traveling-waves, the transverse wave guide impedance of a round wave guide is minimum at the wave guide wall. Since it is desirable to connect the tunnel diode at the lowest impedance point of the wave guide section, the connections shown in FIGURES 1, 2, 3 and 4 provide the best impedance match between the tunnel diodes and the wave guide. As is apparent from each of FIGURES 1, 2, 3 and 4, each of the tunnel diode assemblies is in the path of only a portion of the wall current. When the tunnel diodes are appropriately polarized and biased into the negative resistance regions of their voltage current curves, this arrangement of tunel diodes in the wave guide produces a "negative attenuation" along the direction of propagation in the wave guides. This effect is caused by amplification of the radio-frequency wall current by the tunnel diodes with the resulting amplification of the radio-frequency energy propagated in the wave guide. The configurations shown in each of FIGURES 1, 2, 3 and 4 can therefore be described as chain amplifiers derived from "current distributed" wave guide sections. Each wave guide section having a tunnel diode pumps radio-frequency energy into the wave guide and a fast wave amplification takes place, no delay circuit being required. This may more readily be appreciated by considering a tunnel diode as a negative admittance; then a section of the wave guide, combined with the tunnel diode, may be considered to introduce a "negative attenuation constant" per unit length of the wave guide. Thus, the propagation constant $\gamma_{TD}$ of the tunnel diode per unit length is expressed as follows:

$$\gamma_{TD} = -\alpha_{TD} + J\beta_{TD}$$

where $-\alpha_{TD}$ is the attenuation constant and $\beta_{TD}$ is the phase constant of the tunnel diode in the customary complex theory notation. Similarly, the propagation constant $\gamma_W$ of an empty wave guide is expressed as follows:

$$\gamma_W = \alpha_W + J\beta_W$$

If it is assumed that both phase constants are equal, which is correct to a first approximation, then $\beta_{TD} = \beta_W = \beta$. The total propagation constant of a section of wave guide combined with the tunnel diode is then expressed as follows:

$$\gamma_{total} = (-\alpha_{TD} + \alpha_W) + J\beta$$

If the absolute value of the attenuation constant of the tunnel diode is greater than the absolute value of the attenuation constant of the wave guide, amplification occurs provided, of course, that both the input terminals and the output terminals of the wave guide are matched to the input signal source and the output load, respectively.

Figure 7:
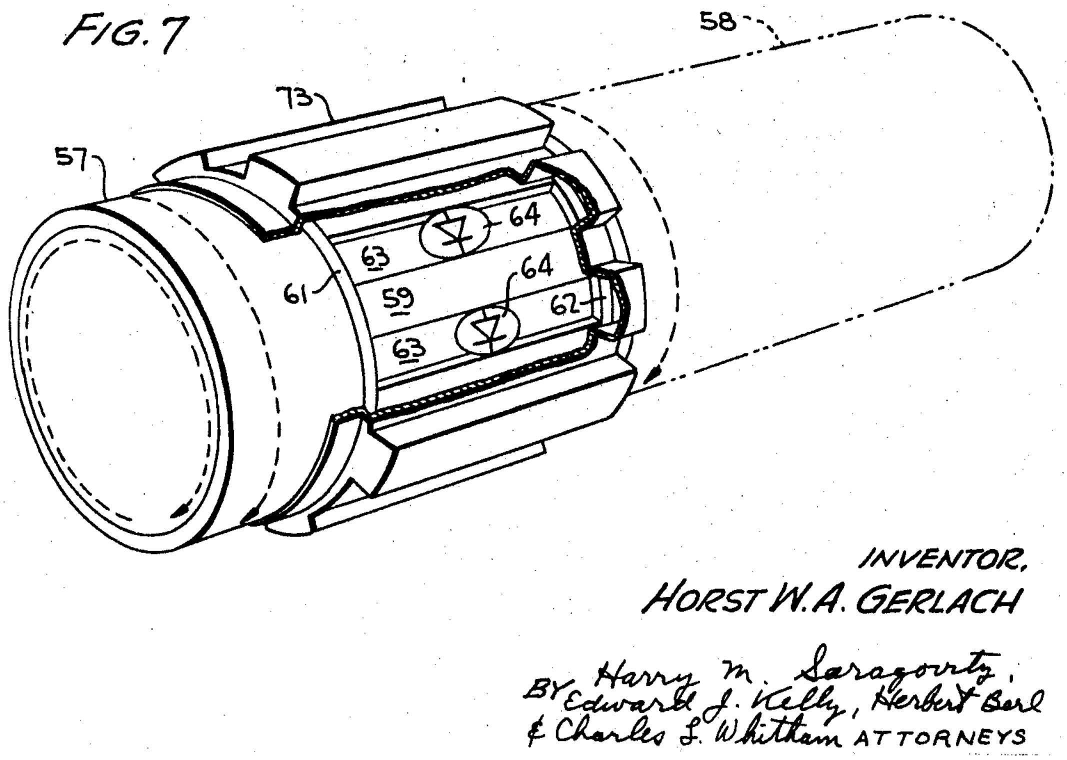
FIGURE 7 is a microwave amplifier according to the present invention using a round wave guide oscillating in the $TE_{01}$ mode and employing a filter-type shield.
Figure 8:
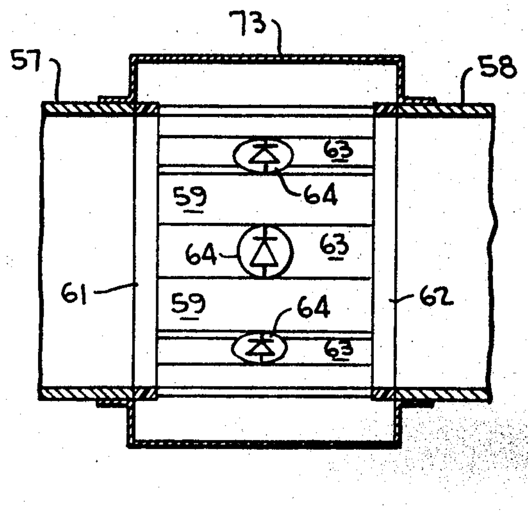
FIGURE 8 is a cross-sectional view of the amplifier shown in FIGURE 7 taken along a plane which is parallel to the axis of a wave guide.
Figure 9:
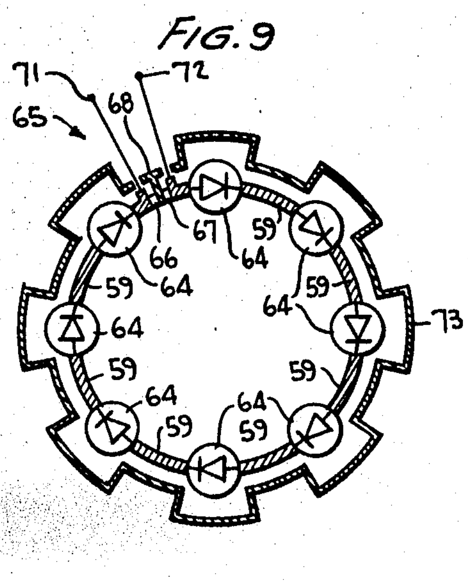
FIGURE 9 is a cross-sectional view of the amplifier shown in FIGURE 7 taken along a plane which is perpendicular to the axis of the wave guide.

FIGURE 7 illustrates a solid state microwave amplifier according to the present invention which takes particular advantage of the circumferential current flow in the $TE_{01}$ mode of propagation. The circumferential wall current flow in this mode of propagation implies that the wave guide can be cut into slices perpendicular to the axis of the wave guide without disturbing the mode properties. This permits mounting tunnel diodes in series circumferentially around the wave guide. The cross-sectional views, as shown in FIGURES 8 and 9, illustrate in greater detail the structure of the amplifier shown in FIGURE 7. The wave guide is split into two parts 57 and 58. A rung and slot assembly comprising a plurality of rungs 59 arranged uniformly about a circumference equal to that of the wave guide sections 57 and 58 and arranged parallel to the axis of the wave guide sections is positioned between the two wave guide sections. Two insulating rings 61 and 62 separate the rung and slot assembly from the wave guide sections 57 and 58. Tunnel diodes 64 are connected across slots 63 between rungs 59. Slots 63 are half-wave length slots fore-shortened by the tunnel diode capacitance. These slots 63 perform exactly the same function as the resonant windows in FIGURES 1, 2, 3 and 4. As shown in FIGURE 9, the circular slices are finally interrupted at 65 by a by-pass capacity which is provided in order to apply the bias voltage for the tunnel diodes. The by-pass capacity comprises two insulating strips 66 and 67 separated by a metal shield 68. The insulating strips 66 and 67 run the entire length of and bridge a gap in one to the rungs 59. A source of DC bias is applied across terminals 71 and 72 which are connected to either half of the rung 59 that is split to form the by-pass capacity. The DC bias voltage is approximately equal to $nxV_{available}$ where $n$ is equal to the number of tunnel diodes and $V_{available}$ equals the available average DC voltage for the peak current and the valley current applied to a single tunnel diode.

Since the tunnel diode current for the series tunnel diode array shown in FIGURES 7, 8 and 9 is the same as it is for a single tunnel diode but the voltage is $nV_{available}$ the output radio-frequency power will be $n$ larger as for a single tunnel diode. As beforementioned, the $TE_{01}$ wave guide may be cut into "slices" which in turn permits the wave guide circuit to be split up into a number of "slices" distributed over the length of the wave guide, and so doing, an amplifier may be constructed which provides an output power that is to a first approximation:

$$P_{total} = P_{DC} nm \eta_{conversion}$$

where $m$ is the number of "slices" and $\eta_{conversion}$ is the conversion efficiency of DC power to radio-frequency power. This system enables the use of "low" current tunnel diodes which usually introduce less difficulties at higher frequencies, such as for example X or lower K band, than "high" current diodes which usually present stability problems. For example, let $n = 8$
$m = 5$
$\eta_{conversion}$ approximately$=10\%$
$I_P = 80$ ma.
$I_V = 10$ ma.
$I_{available} = 70$ ma.
$V_{DC\ available} = 0.250$ volt
$P_{DC\ available} = 17.5$ mw. per tunnel diode
$P_{rf\ total} = 0.1 \times 17.5 \times 4.0$ and
$P_{rf\ total} = 70$ mw.

The "current" of a "high current" tunnel diode requires for the same radio-frequency power output as before $$I_{available} = \frac{70}{0.1} \times \frac{1}{0.35}$$

$$I_{available} = 2000 \text{ ma.}$$

In other words, one has to look for a tunnel diode having the following current ratings:

$I_V$ approximately$=300$ ma.
$I_P$ approximately$=240$ ma.

Such a tunnel diode might be available in the market but it requires an extremely good heat sink for the relatively small volume of the tunnel diode mounting in the circuit. On the other hand, the series tunnel diode array shown in FIGURES 7, 8 and 9 distributes the power to be dissipated over the large surface of the wave guide wall.

In all the cases where the tunnel diode mounts interrupt the wall current flow of the circuit or wave guides, the mounts give rise to radio-frequency radiation losses of the excited oscillations. This radiation can be avoided by proper shielding; however, one has to be aware of unwanted oscillation modes. The shielding can be achieved in one of two ways. First, a filter type shield may be designed which is a center frequency of operation. This will, of course, limit the operational frequency band of the amplifier. This type of shield can also be treated as a periodic delay structure where the pass band characteristic depends on the geometric configuration. A relatively wide band operation of such a structure is possible. Alternatively, a resonator shield may be designed which has a resonant frequency remote from the operational frequency. In this case, any radiated radio frequency power close enough to the operational frequency but remote from the shield resonance will be reflected back into the wave guide, depending upon the coupling between the wave guide and the resonator shield. A filter-type shield is illustrated in FIGURES 7, 8 and 9. The shield 73 is supported by wave guide sections 57 and 58 and covers the rung and slot structure therebetween. The shield 73 comprises a plurality of cavities which are positioned adjacent to each of the slots 63. Each of the cavities and hence each of the slots 63 are separated from the next adjacent slot about the circumference of the wave guide by a quarter wave length at the center operational frequency. This shield structure provides a band pass filter characteristic that is centered at the operational frequency of the amplifier and having a band width which is dependent on the spacing of the shield from the rung and slot assembly and the dimensions of the cavities.

Figure 10:
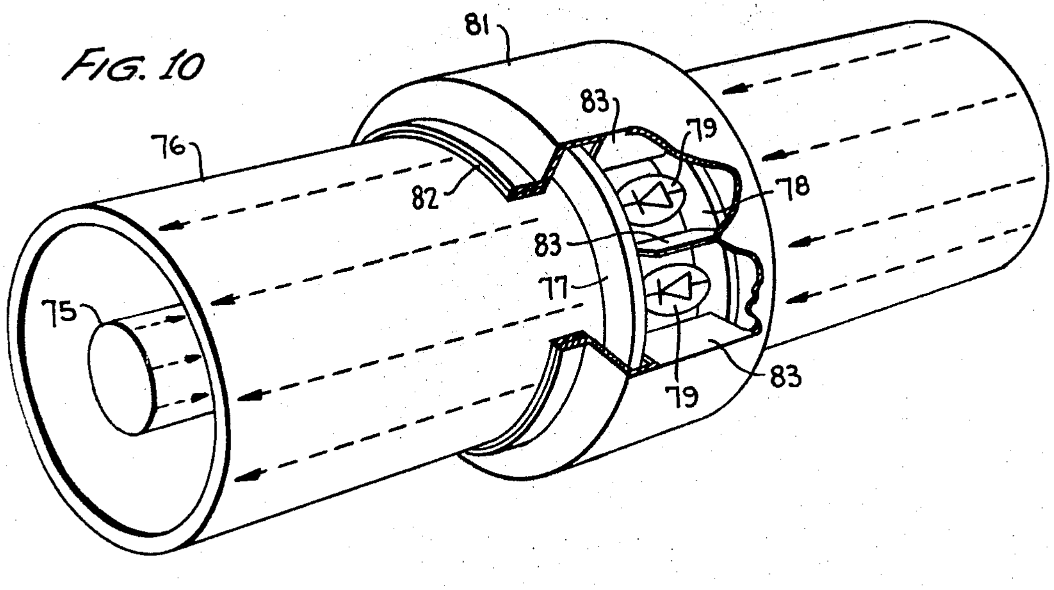
FIGURE 10 is a perspective view of a microwave amplifier according to the present invention using a coaxial transmission line which oscillates in the TEM mode.
Figure 11:
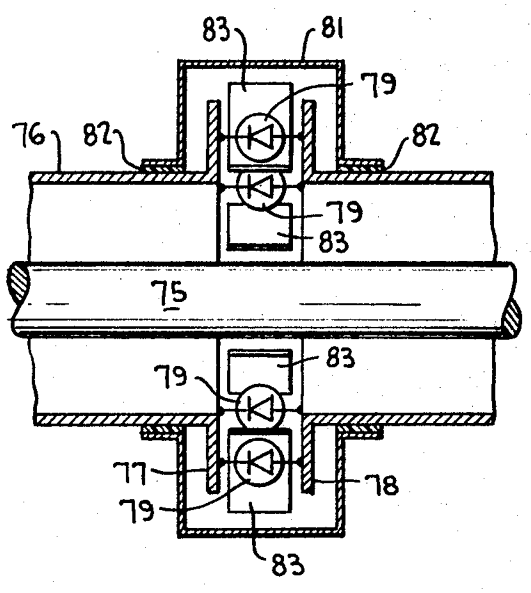
FIGURE 11 is a cross-sectional view of the amplifier shown in FIGURE 10, taken along a plane parallel to the axis of the coaxial line.
Figure 12:
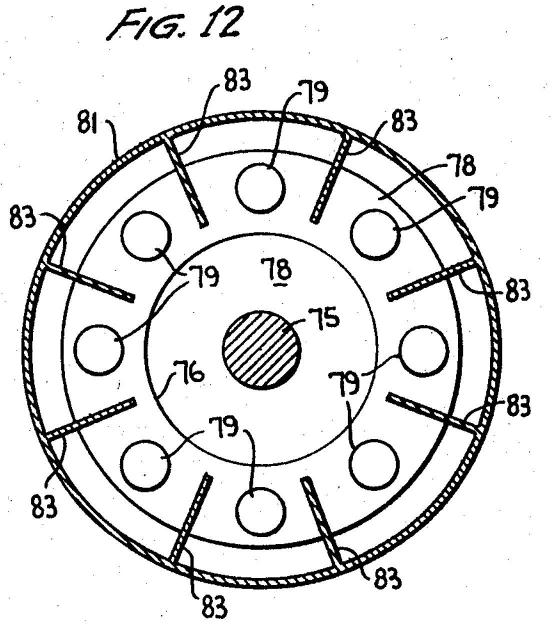
FIGURE 12 is a cross-sectional view of the amplifier shown in FIGURE 10, taken along a plane perpendicular to the axis of the coaxial line.

The third type of oscillation mode with which the present invention is concerned is the TEM mode. This is the mode supported by transmission lines. While the present invention may be applied to most types of transmission lines, it is particularly applicable to coaxial transmission lines. FIGURE 10 shows the configuration of a coaxial transmission line incorporating a tunnel diode array. FIGURES 11 and 12 are cross-sectional views of the amplifier shown in FIGURE 10 and illustrating in greater detail the construction of this amplifier. The amplifier comprises a coaxial line having a center conductor 75 and an outer conductor 75. As illustrated in FIGURE 10 by the dashed arrows, the TEM mode of radio-frequency oscillation exhibits a longitudinal current flow similar to that exhibited in the TM modes of oscillation. A parallel array of tunnel diodes is situated in the path of this longitudinal current flow by splitting the outer conductor into two halves. Adjacent ends of the outer conductor halves 76 are formed into flanges 77 and 78. An array of tunnel diodes 79 is connected between the two flanges. The tunnel diodes in the array are equidistantly distributed around the flanges 77 and 78. Each diode conducts a part of the current in the outer conductor and thus contributes its fraction of the total generated or amplified radio-frequency power. The total radio-frequency power output of this arrangement is simply $$P_{total}=nP_{diode}$$

where $n$=the number of diodes in the array. This expression holds for the fundamental TEM mode.

This device is very broad band by nature. The limitation is only determined by the shielding which behaves like a resonator tightly coupled to the coaxial line. However, if a wide band filter-type shielding of the same impedance as the coaxial section is designed, a reasonably wide pass band may be achieved. Such a shield is illustrated in FIGURES 10, 11 and 12. This shield 81 comprises a cylindrical can having ends through which the outer conductor 76 passes. The shield 81 covers the junction between the sections of outer conductor 76 and is electrically insulated therefrom by insulating material 82. Within the filter can are a plurality of coupling diaphragms 83 which are attached to the inside of the filter can and project between, but do not touch, flanges 77 and 78. One coupling diaphragm is positioned between each adjacent tunnel diode 79. A source of direct current bias voltage may be conveniently connected to the two sections of the outer conductor 76.

Figure 13:
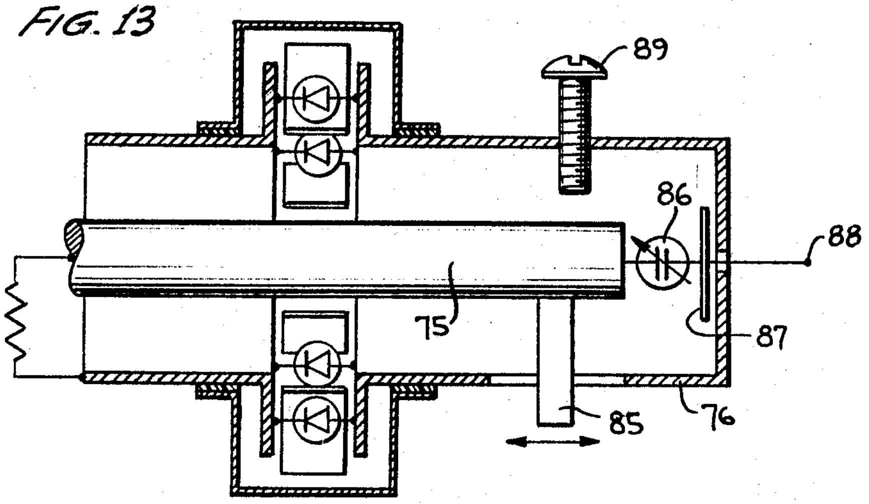
FIGURE 13 is a cross-sectional view of an oscillator according to the present invention which may be mechanically or electronically tuned over a wide frequency range.

FIGURE 13 illustrates how the basic coaxial amplifier, shown in FIGURES 10, 11 and 12, may be made into a tunable oscillator. Mechanical tuning is attained by providing a slidable short 85 which terminates one end of the coaxial amplifier. The total reflection obtained represents the "feed-back" and permits the generation of microwave frequency oscillations. Alternatively, electronic tuning may be attained by providing a termination comprising a varactor diode 86 which is connected at one end to the center conductor 75 and at the other end by way of a feed-through capacitor 87 to a source of modulating voltage connected to terminal 88. In either case, a matching stub 89 may be provided. For maximum radio-frequency power output, the terminal impedance of the oscillator should be matched to the characteristic impedance of the coaxial line.

It will be apparent that the embodiment shown is only exemplary and that various modifications can be made in construction and arrangement within the scope of the invention as defined in the appended claims.

I claim as my invention:

1. A solid state microwave wall current amplifier comprising:

(a) a round wave guide having a series of regularly spaced resonant windows and rungs in its wall, said windows and rungs oriented parallel to the axis of said wave guide and arranged circumferentially around said wave guide;

(b) an array of negative resistance solid state devices, each negative resistance solid state device of said array being fabricated into a separate rung in said wall of said wave guide to carry only a fractional portion of the total radio-frequency current flowing in said wall of said wave guide when radio-frequency energy is being propagated through said wave guide.

2. A solid state microwave wall current amplifier as recited in claim 1 wherein said negative resistance solid state devices are tunnel diodes and are fabricated into alternate rungs only in said wall of said wave guide.

3. A solid state microwave wall current amplifier as recited in claim 2 further comprising means connected to each of said tunnel diodes in said array for biasing said tunnel diodes into their negative conducting regions.

4. A solid state microwave wall current amplifier as recited in claim 3 wherein all of said tunnel diodes in said array are polarized in the same direction.

5. A solid state microwave wall current amplifier as recited in claim 3 wherein half of said tunnel diodes in said array are polarized in the opposite direction to the remaining half.

6. A solid state microwave wall current amplifier comprising:

(a) a first round wave guide section, (b) a second round wave guide section having the same diameter as said first round wave guide section and axially aligned therewith in spaced apart relation, (c) a rung and slot structure having a diameter equal to the diameter of said first and second round wave guide sections and positioned between said first and second round wave guide sections in rigid mechanical cooperation therewith, said rung and slot structure being electrically insulated from said first and second round wave guide sections, (d) a series array of negative resistance solid state devices, each of said devices in said array being positioned in one of the slots of said rung and slot structure, and (e) means connected in series with said series array of negative resistance solid state devices for biasing said devices into their negative conducting regions.

7. A solid state microwave wall current amplifier as recited in claim 6 further comprising a filter-type shield positioned around said rung and slot structure and electrically connected to said first and second wave guide sections and mechanically supported thereby.

8. A solid state microwave wall current amplifier comprising:

(a) a first round wave guide section, (b) a second round wave guide section having a diameter equal to said first round wave guide section, said second round wave guide section being axially aligned with said first wave guide section and spaced apart therefrom, (c) a coaxial inner conductor positioned within said first and second round wave guide sections, (d) a parallel array of negative resistance solid state devices connected between said first and second round wave guide sections, and (e) means connected to said first and second round wave guide sections for biasing said negative resistance solid state devices into their negative conducting regions.

9. A solid state microwave wall current amplifier as recited in claim 8 further comprising a filter-type shield positioned around said parallel array of negative resistance solid state devices and mechanically supported by said first and second round wave guide sections, said filter-type shield being electrically insulated from said first and second wave guide sections.

10. A solid state microwave wall current oscillator comprising:

(a) a first round wave guide section, (b) a second round wave guide section having a diameter equal to said first round wave guide section and axially aligned therewith in spaced apart relation, (c) a coaxial inner conductor positioned inside of said first and second round wave guide sections, (d) a parallel array of negative resistance solid state devices connected between said first and second round wave guide sections, (e) means connected to said first and second round wave guide sections for biasing said negative resistance solid state devices into their negative conducting regions, (f) a filter-type shield positioned around said parallel array of negative resistance solid state devices and mechanically supported by said first and second round wave guide sections, said filter-type shield being electrically insulated from said first and second round wave guide sections, and (g) means terminating said second wave guide section for producing total reflection of incident radio-frequency energy thereby forming a standing wave microwave oscillator.

11. A solid state microwave wall current oscillator as recited in claim 10 wherein said means terminating said second wave guide section is mechanically movable longitudinally along the length of said second wave guide section, thereby permitting mechanical tuning of said microwave oscillator.

12. A solid state microwave wall current oscillator as recited in claim 10 wherein said means terminating said second wave guide section comprises:

(a) a varactor diode connected at one end to said inner connector and (b) means connected to the other end of said varactor diode and to said second wave guide section for varying the voltage across said varactor diode, thereby varying the capacity of the junction of said varactor diode and causing said oscillator to be electronically tuned.

References Cited

UNITED STATES PATENTS

| | | | |
|---|---|---|---|
| 3,094,664 | 6/1963 | Kibler | 331—96 X |
| 3,171,086 | 2/1965 | Gerlach | 330—43 |
| 3,254,309 | 5/1966 | Miller | 330—43 |
| 3,320,550 | 5/1967 | Gerlach | 331—96 |

OTHER REFERENCES

"Introduction to Microwaves" by Gershon J. Wheeler, November 1964, copy in Group #255, TK7870 W38 C·2, pp. 56 to 60, relied upon.

HERMAN KARL SAALBACH, *Primary Examiner.*

SAXFIELD CHATMON, Jr., *Assistant Examiner.*

U.S. Cl. X.R.

307—322; 315—3.5; 330—34; 331—96, 115; 333—98